United States Patent
Little et al.

(10) Patent No.: US 10,067,754 B2
(45) Date of Patent: Sep. 4, 2018

(54) SOFTWARE SERVICE NOTIFICATIONS BASED UPON SOFTWARE USAGE, CONFIGURATION, AND DEPLOYMENT TOPOLOGY

(75) Inventors: Rodney A. Little, Poughkeepsie, NY (US); Leho Nigul, Richmond Hill (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 752 days.

(21) Appl. No.: 13/207,958

(22) Filed: Aug. 11, 2011

(65) Prior Publication Data

US 2013/0042230 A1 Feb. 14, 2013

(51) Int. Cl.
| | | |
|---|---|---|
| G06F 9/44 | (2018.01) | |
| G06F 8/61 | (2018.01) | |
| G06F 8/65 | (2018.01) | |

(52) U.S. Cl.
CPC ............. *G06F 8/64* (2013.01); *G06F 8/61* (2013.01); *G06F 8/65* (2013.01)

(58) Field of Classification Search
CPC ........ G06F 8/65; G06F 17/30575; G06F 8/68; G06F 8/61; G06F 8/64; H04L 67/34; G06Q 10/101
USPC .......... 717/168–178; 709/203, 231; 707/100, 707/203
See application file for complete search history.

(56) References Cited

U.S. PATENT DOCUMENTS

| | | | |
|---|---|---|---|
| 5,675,802 A * | 10/1997 | Allen et al. ................... | 717/103 |
| 6,353,926 B1 | 3/2002 | Parthesarathy et al. | |
| 7,134,121 B2 | 11/2006 | Bates et al. | |
| 7,143,406 B2 | 11/2006 | Kenyon et al. | |
| 7,555,749 B2 | 6/2009 | Wickham et al. | |
| 2002/0100036 A1 * | 7/2002 | Moshir et al. ................ | 717/173 |
| 2005/0080801 A1 * | 4/2005 | Kothandaraman et al. .. | 707/100 |

(Continued)

OTHER PUBLICATIONS

Author Unknown, Software and hardware topologies, IBM WebSphere Portal, Version 5.1, Nov. 7, 2007, pp. 1-2, IBM Corporation, Published on the World Wide Web at: http://publib.boulder.ibm.com/infocenter/wpdoc/v510/index.jsp?topic=/com.ibm.wp.zos.doc/wpf/plan_top.html.

(Continued)

*Primary Examiner* — Tuan Vu
(74) *Attorney, Agent, or Firm* — Lee Law, PLLC; Christopher B. Lee

(57) ABSTRACT

Software configuration information and topological information associated with a group of software program instances installed on at least one computing device are tracked. An available software update is identified for at least one of the group of software program instances. At least one software update suggestion rule that specifies a target software configuration and a target topological dependency to which the available software update applies is evaluated against the tracked software configuration information and topological information. A determination is made as to whether the available software update is targeted to the tracked software configuration information and topological information based upon the evaluation of the at least one software update suggestion rule. A notification of the available software update is provided in response to determining that the available software update is targeted to the tracked software configuration information and topological information.

15 Claims, 5 Drawing Sheets

(56) References Cited

U.S. PATENT DOCUMENTS

| | | | |
|---|---|---|---|
| 2005/0086357 A1* | 4/2005 | Lipsky et al. | 709/231 |
| 2006/0075001 A1* | 4/2006 | Canning et al. | 707/203 |
| 2006/0080656 A1* | 4/2006 | Cain et al. | 717/174 |
| 2007/0157192 A1 | 7/2007 | Hoefler et al. | |
| 2010/0058313 A1 | 3/2010 | Hansmann et al. | |
| 2010/0088692 A1* | 4/2010 | Rathi et al. | 717/171 |
| 2011/0099547 A1* | 4/2011 | Banga | 717/176 |
| 2011/0137979 A1* | 6/2011 | Seo et al. | 709/203 |

OTHER PUBLICATIONS

Author Unknown, Planning your software topology, IBM WebSphere IP Multimedia Subsystem Connector, Version 6.2, 2009, pp. 1-3, IBM Corporation, Published on the World Wide Web at: http://publib.boulder.ibm.com/infocenter/wtelecom/v7r0m0/index.jsp?topic=/com.ibm.diameter.plan.doc/inst_c.html.

United States Patent and Trademark Office, Office Action for U.S. Appl. No. 13/433,999, dated Jul. 17, 2013, pp. 1-22, Alexandria, VA, USA.

United States Patent and Trademark Office, Notice of Allowance for U.S. Appl. No. 13/433,999, dated Nov. 22, 2013, pp. 1-20, Alexandria, VA, USA.

\* cited by examiner

SOFTWARE SERVICE NOTIFICATIONS BASED UPON SOFTWARE USAGE, CONFIGURATION, AND DEPLOYMENT TOPOLOGY

BACKGROUND

The present invention relates to software update and service availability and applicability. More particularly, the present invention relates to software service notifications based upon software usage, configuration, and deployment topology.

Software applications are often coded and tested prior to release for sale or other distribution. The software applications may have new features and/or defect fixes added after the initial release or distribution. These new features may be included as an update to a previously-released version or may form a portion of a new version of a given software application. The updated software application or the new version of the software application may be released for sale or other distribution.

BRIEF SUMMARY

A method includes tracking software configuration information and topological information associated with a plurality of software program instances installed on at least one computing device; identifying an available software update for at least one of the plurality of software program instances; evaluating at least one software update suggestion rule that specifies a target software configuration and a target topological dependency to which the available software update applies against the tracked software configuration information and topological information; determining whether the available software update is targeted to the tracked software configuration information and topological information based upon the evaluation of the at least one software update suggestion rule; and providing a notification of the available software update in response to determining that the available software update is targeted to the tracked software configuration information and topological information.

A system includes a memory and a processor programmed to track, within the memory, software configuration information and topological information associated with a plurality of software program instances installed on at least one computing device; identify an available software update for at least one of the plurality of software program instances; evaluate at least one software update suggestion rule that specifies a target software configuration and a target topological dependency to which the available software update applies against the tracked software configuration information and topological information; determine whether the available software update is targeted to the tracked software configuration information and topological information based upon the evaluation of the at least one software update suggestion rule; and provide a notification of the available software update in response to determining that the available software update is targeted to the tracked software configuration information and topological information.

A computer program product includes a computer readable storage medium including computer readable program code, where the computer readable program code when executed on a computer causes the computer to track software configuration information and topological information associated with a plurality of software program instances installed on at least one computing device; identify an available software update for at least one of the plurality of software program instances; evaluate at least one software update suggestion rule that specifies a target software configuration and a target topological dependency to which the available software update applies against the tracked software configuration information and topological information; determine whether the available software update is targeted to the tracked software configuration information and topological information based upon the evaluation of the at least one software update suggestion rule; and provide a notification of the available software update in response to determining that the available software update is targeted to the tracked software configuration information and topological information.

DETAILED DESCRIPTION

Figure 1:
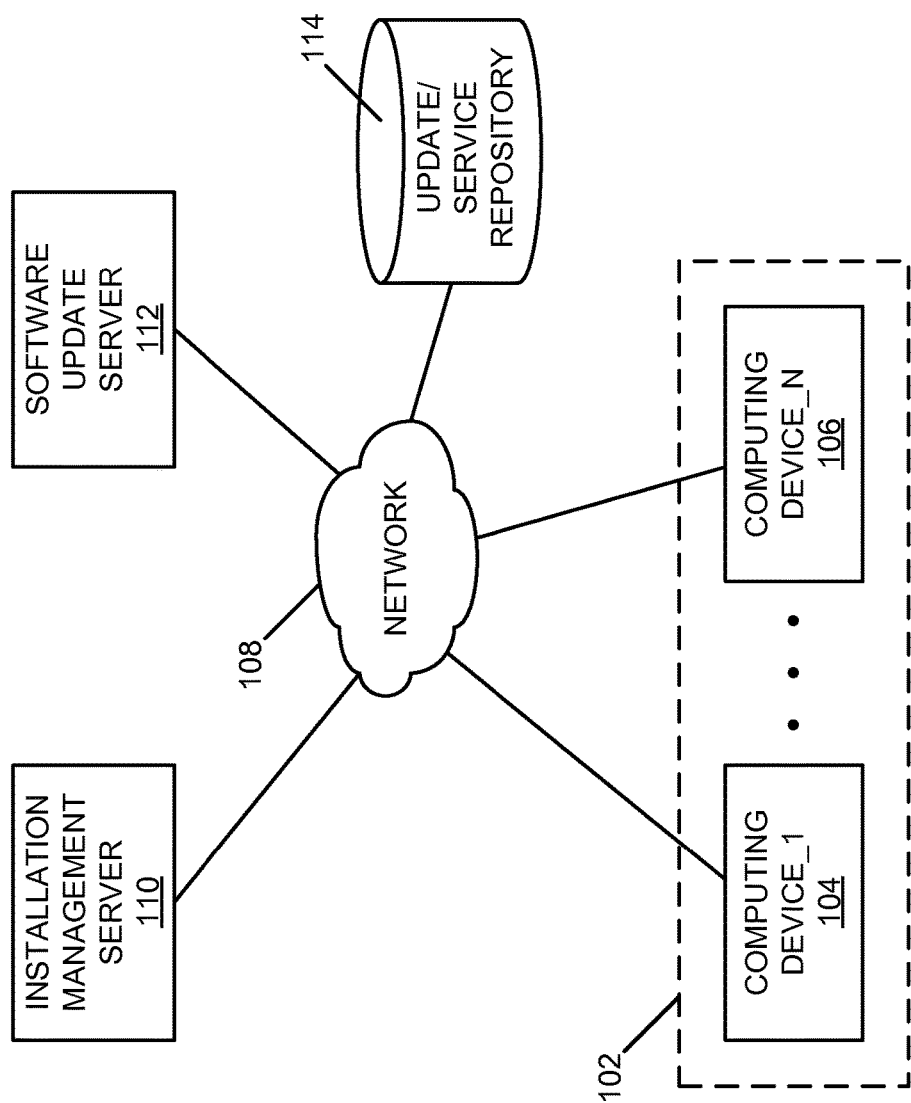
FIG. 1 is a block diagram of an example of an implementation of a system for automated software service notifications based upon software usage, configuration, and deployment topology according to an embodiment of the present subject matter.

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides software service notifications based configuration and deployment topology. The present subject matter may also provide software service notifications based upon user software usage. For purposes of the present description, the examples herein may refer to configuration and deployment topology, or may refer to user software usage in conjunction with configuration and deployment topology, as convenient for purposes of description. However, it is understood that the present subject matter may be implemented in association with software service notifications based upon configuration and deployment topology, or may be implemented in association with software service notifications based user software usage in conjunction with configuration and deployment topology without departure from the scope of the present subject matter.

Software configuration information and topological information associated with software program instances installed on computing devices are tracked. As noted above, user software usage information may also be tracked. In response to identification of an available update for a software program instance, a software update suggestion rule is evaluated against the tracked software configuration information and topological information, and against the tracked user software usage information, as appropriate for the given implementation. The software update suggestion rule specifies a target software configuration and a target topological dependency to which the available software update applies, and a target usage pattern to which the available software update applies again as appropriate for the given implementation. A determination is made as to whether the available software update is targeted to the tracked software configuration information and topological information, and additionally the user software usage information as appropriate for the given implementation, based upon the evaluation of the software update suggestion rule. A notification of the available software update is provided in response to determining that the available software update is targeted to the tracked software configuration information and topological information, and additionally the user software usage information as appropriate for the given implementation.

It should be noted that the notification may be provided to an installation management server, to the computing device associated with the tracked information, or to any other device as appropriate for a given implementation. Based on these notifications, the installation management server administrator may decide to update specific computing devices that are managed by the installation management server. Notification of the available update is postponed for any computing device in response to determining that the available update is not targeted to that particular computing device based upon its usage and installation. As such, users may be informed of available software updates that are relevant/targeted to their particular software usage, configuration, and topology, and are not burdened with searching for available updates or being notified of updates that are not particularly relevant or targeted to their usage and installation.

Software programs for which software service notifications may be provided as described herein may include application-level programs, middleware, embedded software programs, device control programs, software that implements network stacks, or any other software that may be updated after initial release and distribution. Software programs and computer systems may include multiple installed hardware and software components that may be configured in various ways for each particular installation. Installation platform and inter-component topology may also be utilized to vary installation or configuration of one or more of the components. Usage patterns of different users may result in access of different functionality in different components, such that each usage pattern may be unique relative to other installations, configurations, and topologies. As such, the present subject matter provides for software service suggestions/notifications based on the software usage patterns, configurations, and deployment topologies. The present subject matter may be applied, for example, to computing systems ranging from handheld or stand-alone devices/computing systems through complex enterprise systems and environments.

For purposes of the present description, possible updates and service availability may be referred to generally as "service updates" or "software updates" in certain examples to ease description of the present subject matter. It is understood that the phrase "service update" or "software update" may apply to any available change (e.g., a new version, a patch or fix applicable to a certain version, etc.) to one or more software programs and/or executing systems with respect to configuration, topology, or any other aspect appropriate for a given implementation. The phrase "installation-specific aspect" refers to configuration, topology, and usage patterns identified in association with one or more particular installed systems. Further, the phrase "program-specific aspect" refers to available features, configuration options, usability variants, and other aspects of one or more software programs that may be identified in association with installation, upgrades, fixes, or other aspects of distribution and maintenance of distributed software programs.

The term "configuration" may be used to refer to installation options for a given software program (e.g., application server, or other program), such as how the software program is installed, different purposes for a particular set of installations (e.g., participant in a cluster, or a cluster manager/administrator, etc.), or any other configurable option that defines one or more behaviors of a product installation (i.e., there may be different configurable behaviors for same installed package). A "configuration" option may also include information about how a particular installation is configured to work with one or more other products' installation options. Selectable user options may also be considered a "configuration" for purposes of the present subject matter. As such, a configuration may refer to how a particular program instance is configured for a particular target or target platform.

The phrase "topology" and "topological" as used herein refer to interconnectivity between programs and/or devices, and dynamic options for interplay between programs and/or devices. For example, topological information may include information such as different responsibilities that may be configured for programs and/or devices, inter-product dependencies (e.g., relations to other products) that may exist, and any other variation between different installed programs, devices, and systems, as appropriate for a given implementation. As such, the concept of topology applies to interplay between multiple instances of a software program and one or more devices or systems. Additionally, for stand-alone installations, the concept of topology may apply to interaction configurations, interconnectivity, and interplay between different program instances or installed systems.

The phrases "usage pattern," "usage information," "software usage information," or "user software usage information" refer to any user use characteristic of a software program that may be monitored and tracked to determine usage for the particular software program by one or more users. For example, if a user has enabled macros within a particular program and uses macros, then software usage information for that particular program instance may include macro usage indications/identifiers. As such, available updates for macro functionality associated with the software program may be identified and suggested to the user as described in more detail below. Alternatively, if a user has disabled macros within the particular software program and does not use macros, then the software usage information for that particular program instance will not include macro use indications/identifiers. Accordingly, available updates for macro functionality associated with the software program need not be identified or suggested to the user as described in more detail below.

The present subject matter utilizes and distributes one or more "software update suggestion rules" with corresponding service updates. The suggestion rules specify target configurations, target topologies, and/or target usage patterns for one or more software program(s) for which the particular available program or service update(s) is/are applicable. The software update suggestion rules may be distributed with service updates and processed by either a centralized or distributed installation manager to determine whether to suggest the particular service update(s) for each installed system managed by the respective installation manager (e.g., provide a notification).

Installation-specific aspects of an installed system (e.g., configuration, topology, and usage patterns, etc.) may be analyzed to determine whether program-specific aspects of the software program(s) associated with a particular service update are utilized by the installed system. The installation-specific aspects are then compared with the software update suggestion rule(s) associated with a service update to determine whether the service update is applicable to the respective installed system based upon the program-specific aspects of the software program(s) associated with the particular service update. Where there is a match between the software update suggestion rule(s) for a particular service update and the installation-specific aspects of the installed system, the particular service update(s) may be suggested to the user or administrator of the installed system. The user or administrator may then choose to install the respective service update(s), defer installation of the respective service update(s), or not install the respective service update(s). As such, the software update suggestion rules correlate relevance of available upgrades and fixes associated with service updates with installation-specific aspects of installed systems, and users do not have to search for available updates or process updates that are not relevant to the users' particular configuration, topology, or usage patterns. Accordingly, rule-based patterns are provided by the software update suggestion rules for identification of system installations that may utilize program-specific aspects of one or more software program(s) to which a particular service update is applicable.

It should be noted that conception of the present subject matter resulted from recognition of certain limitations associated with software update and service availability to consumers/users. For example, it has been recognized that users of software programs are required to engage in lengthy and time consuming browsing of software developer web sites that show all possible updates and services notifications for a particular software program, or that the users are notified of all possible updates and service availability. In either situation, the user is required to determine which updates or service notifications are appropriate, which also takes a significant amount of time, or users may be forced to install service updates that they do not need. The present subject matter improves software update and service availability by providing tracking of user software usage patterns along with installed software configurations and deployment topologies.

Unnecessary updates may further require a complete system re-test of solution packages within large complex enterprise systems, which result in expensive rollout procedures. The present subject matter may further filter available software updates and service availability based upon the tracked usage patterns and installed software configurations/deployment topologies, and provide notifications of software updates and service availability that are relevant to each particular user or installation. As such, users are notified of software updates and service availability that are relevant to their particular use of a particular software program and their particular installed configuration and/or deployment, and the users are not required to engage in lengthy and time consuming browsing of developer web sites of update notifications that show all possible updates and services availability for a particular software program. As such, improved notification of software updates and service availability may be obtained through software service notifications based upon software usage, configuration, and deployment topology described herein.

The software service notifications based upon software usage, configuration, and deployment topology described herein may be performed in real time to allow prompt notification of suggestions for updates that are relevant for a particular installed configuration and topology, and the usage patterns associated with the particular installation. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

FIG. 1 is a block diagram of an example of an implementation of a system 100 for automated software service notifications based upon software usage, configuration, and deployment topology. A computing environment 102 includes a computing device_1 104 through a computing device_N 106 that communicate via a network 108 with an installation management server 110. The installation management server 110 may process installation and configuration options, along with topological aspects of software program(s) installed on the computing device_1 104 through the computing device_N 106. For example, the computing device_1 104 through the computing device_N 106 and the installation management server 110 may include application servers, where the installation management server 110 manages installation of the application server program(s) on the computing device_1 104 through the computing device_N 106. As such, the installation management server 110 is configured differently from the computing device_1 104 through the computing device_N 106 because it is configured to manage installation of the other devices. Further, installation-specific interconnection and responsibility differences may exist between the respective devices. Inter-product dependencies may also exist. These differences in configuration may be known to the installation management server 110 or communicated from the respective computing device_1 104 through the computing device_N 106 to the installation management server 110 for monitoring and tracking, either during installation, during one or more subsequent initializations, or in response to a query from the installation management server 110. Any such recurring communications may be periodic, aperiodic, or otherwise as appropriate for a given implementation. Further, user configuration options/changes and usage patterns may be communicated from the respective computing device_1 104 through the computing device_N 106 to the installation management server 110 to allow the installation management server 110 to track configuration and topology changes, and usage patterns, respectively, at the respective managed devices.

Further, the topology of the respective devices may be dictated by network connectivity, proximity, differences between configurations, and other factors. Other examples of one device operating as an installation manager for one or more other devices are possible and all are considered within the scope of the present subject matter. Further, it is understood that the present subject matter applies to stand-alone installations without departure from the scope of the present subject matter.

A software update server 112 provides notification services to the installation management server 110 of available service updates for software programs managed for installation by the installation management server 110. An update/service repository 114 stores service updates for distribution within the system 100 and may store the service updates in any manner appropriate for a given implementation. As described above and in more detail below, the software update server 112 provides notifications of available service updates to the installation management server 110. The notifications may be in the form of update suggestion rules, or otherwise as appropriate for a given implementation, that correlate available service updates with a particular configuration, topology, usage pattern, or other aspect of installed systems to which a particular service update is applicable.

As will be described in more detail below in association with FIG. 2 through FIG. 5, the software update server 112 and/or the installation management server 110 provide automated software service notifications based upon software usage, configuration, and deployment topology. The automated software service notifications based upon software usage, configuration, and deployment topology considers installation-specific aspects associated with installed systems, such as the computing device_1 104 through the computing device_N 106, and the installation management server 110 itself, as appropriate for a given implementation, based upon the software update suggestion rules.

It should be noted that the computing device_1 104 through the computing device_N 106, the installation management server 110, and the software update server 112 may be a portable computing device, either by a user's ability to move the computing device to different locations, or by the computing device's association with a portable platform, such as a plane, train, automobile, or other moving vehicle. It should also be noted that the computing device may be any computing device capable of processing information as described above and in more detail below. For example, the respective computing device's may include devices such as a personal computer (e.g., desktop, laptop, etc.) or a handheld device (e.g., cellular telephone, personal digital assistant (PDA), email device, music recording or playback device, etc.), or any other device capable of processing information as described in more detail below.

The network 108 may include any form of interconnection suitable for the intended purpose, including a private or public network such as an intranet or the Internet, respectively, direct inter-module interconnection, dial-up, wireless, or any other interconnection mechanism capable of interconnecting the respective devices.

The installation management server 110 and the software update server 112 may additionally include any device capable of providing data, software programs, and management services for a device, such as the computing device_1 104 through the computing device_N 106, via a network, such as the network 108.

Figure 2:
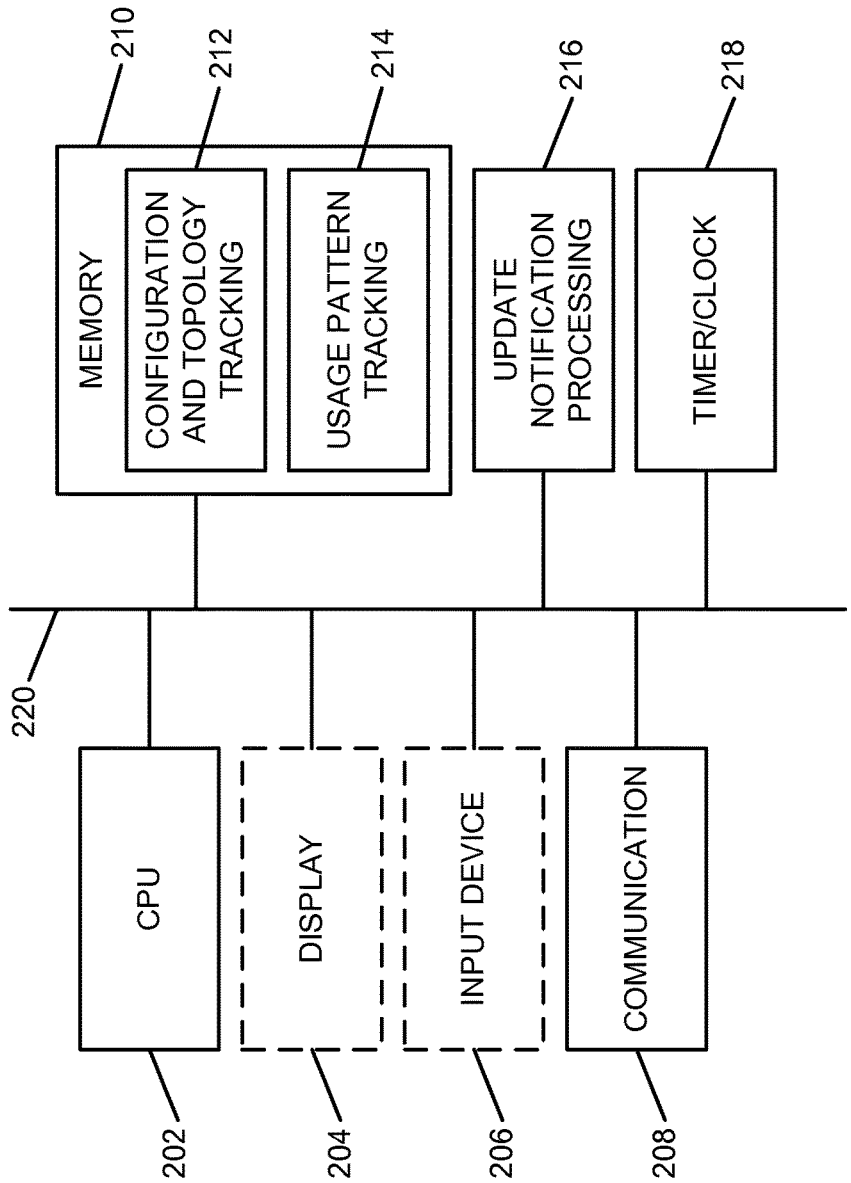
FIG. 2 is a block diagram of an example of an implementation of a core processing module capable of performing automated software service notifications based upon software usage, configuration, and deployment topology according to an embodiment of the present subject matter.

FIG. 2 is a block diagram of an example of an implementation of a core processing module 200 capable of performing automated software service notifications based upon software usage, configuration, and deployment topology. The core processing module 200 may be associated with either the computing device_1 104 through the computing device_N 106, or the installation management server 110, or the software update server 112, as appropriate for a given implementation. Further, the core processing module 200 may provide different and complementary processing of installation-specific aspect tracking (e.g., configuration, topology, and usage patterns, etc.), available service updates, and update suggestion rules based upon the functionality of the respective device. As such, for any of the examples below, it is understood that any aspect of functionality described with respect to any one device that is described in conjunction with another device (e.g., sends/sending, etc.) is to be understood to concurrently describe the functionality of the other respective device (e.g., receives/receiving, etc.).

A central processing unit (CPU) 202 provides computer instruction execution, computation, and other capabilities within the core processing module 200. A display 204 provides visual information to a user of the core processing module 200 and an input device 206 provides input capabilities for the user.

The display 204 may include any display device, such as a cathode ray tube (CRT), liquid crystal display (LCD), light emitting diode (LED), electronic ink displays, projection, touchscreen, or other display element or panel. The input device 206 may include a computer keyboard, a keypad, a mouse, a pen, a joystick, or any other type of input device by which the user may interact with and respond to information on the display 204.

It should be noted that the display 204 and the input device 206 are illustrated with a dashed-line representation within FIG. 2 to indicate that they may be optional components for the core processing module 200 for certain implementations. Accordingly, the core processing module 200 may operate as a completely automated embedded device without direct user configurability or feedback. However, the core processing module 200 may also provide user feedback and configurability via the display 204 and the input device 206, respectively.

A communication module 208 provides interconnection capabilities that allow the core processing module 200 to communicate with other modules within the system 100, such as the modules described above, to perform the automated software service notifications based upon software usage, configuration, and deployment topology described herein. The communication module 208 may include any electrical, protocol, and protocol conversion capabilities useable to provide the interconnection capabilities. Though the communication module 208 is illustrated as a component-level module for ease of illustration and description purposes, it should be noted that the communication module 208 may include any hardware, programmed processor(s), and memory used to carry out the functions of the communication module 208 as described above and in more detail below. For example, the communication module 208 may include additional controller circuitry in the form of application specific integrated circuits (ASICs), processors, antennas, and/or discrete integrated circuits and components for performing communication and electrical control activities associated with the communication module 208. Additionally, the communication module 208 may include interrupt-level, stack-level, and application-level modules as appropriate. Furthermore, the communication module 208 may include any memory components used for storage, execution, and data processing for performing processing activities associated with the communication module 208. The communication module 208 may also form a portion of other circuitry described without departure from the scope of the present subject matter.

A memory 210 includes a configuration and topology tracking storage area 212 that stores configuration and topology information either for the device associated with the core processing module 200 or for one or more other devices where the particular core processing module 200 operates as an installation management server for the one or more other devices. A usage pattern tracking storage area 214 stores usage pattern information either for the device associated with the core processing module 200 or for one or more other devices where the particular core processing module 200 operates as an installation management server for the one or more other devices.

It is understood that the memory 210 may include any combination of volatile and non-volatile memory suitable for the intended purpose, distributed or localized as appropriate, and may include other memory segments not illustrated within the present example for ease of illustration purposes. For example, the memory 210 may include a code storage area, an operating system storage area, a code execution area, and a data area without departure from the scope of the present subject matter.

An update notification processing module 216 is also illustrated. The update notification processing module 216 provides processing capabilities for configuration, topology, and usage pattern information, as described above and in more detail below. For example, where the update notification processing module 216 is implemented in association with one of the computing device_1 104 through the computing device_N 106, the update notification processing module 216 operates to record configuration, topology, and usage pattern information for processing either locally in response to service update notifications or remotely by a device, such as the installation management server 110. Alternatively, where the update notification processing module 216 is implemented in association with the installation management server 110, the update notification processing module 216 may receive configuration, topology, and usage pattern information from computing devices, such as the computing device_1 104 through the computing device_N 106, for processing as described above and in more detail below. As such, the update notification processing module 216 implements the automated software service notifications based upon software usage, configuration, and deployment topology of the core processing module 200.

Though the update notification processing module 216 is illustrated as a component-level module for ease of illustration and description purposes, it should be noted that the update notification processing module 216 may include any hardware, programmed processor(s), and memory used to carry out the functions of this module as described above and in more detail below. For example, the update notification processing module 216 may include additional controller circuitry in the form of application specific integrated circuits (ASICs), processors, and/or discrete integrated circuits and components for performing communication and electrical control activities associated with the respective devices. Additionally, the update notification processing module 216 may include interrupt-level, stack-level, and application-level modules as appropriate. Furthermore, the update notification processing module 216 may include any memory components used for storage, execution, and data processing for performing processing activities associated with the module.

It should also be noted that the update notification processing module 216 may form a portion of other circuitry described without departure from the scope of the present subject matter. Further, the update notification processing module 216 may alternatively be implemented as an application stored within the memory 210. In such an implementation, the update notification processing module 216 may include instructions executed by the CPU 202 for performing the functionality described herein. The CPU 202 may execute these instructions to provide the processing capabilities described above and in more detail below for the core processing module 200. The update notification processing module 216 may form a portion of an interrupt service routine (ISR), a portion of an operating system, a portion of a browser application, or a portion of a separate application without departure from the scope of the present subject matter.

A timer/clock module 218 is illustrated and used to determine timing and date information, such as for periodic or aperiodic querying of a computing device to obtain/track user software usage information, configuration information, and related topological information, as described above and in more detail below. As such, the update notification processing module 216 may utilize information derived from the timer/clock module 218 for information processing activities as described herein.

The CPU 202, the display 204, the input device 206, the communication module 208, the memory 210, the update notification processing module 216, and the timer/clock module 218 are interconnected via an interconnection 220. The interconnection 220 may include a system bus, a network, or any other interconnection capable of providing the respective components with suitable interconnection for the respective purpose.

While the core processing module 200 is illustrated with and has certain components described, other modules and components may be associated with the core processing module 200 without departure from the scope of the present subject matter. Additionally, it should be noted that, while the core processing module 200 is described as a single device for ease of illustration purposes, the components within the core processing module 200 may be co-located or distributed and interconnected via a network without departure from the scope of the present subject matter. For a distributed arrangement, the display 204 and the input device 206 may be located at a point of sale device, kiosk, or other location, while the CPU 202 and memory 210 may be located at a local or remote server. Many other possible arrangements for components of the core processing module 200 are possible and all are considered within the scope of the present subject matter. Accordingly, the core processing module 200 may take many forms and may be associated with many platforms.

Figure 3:
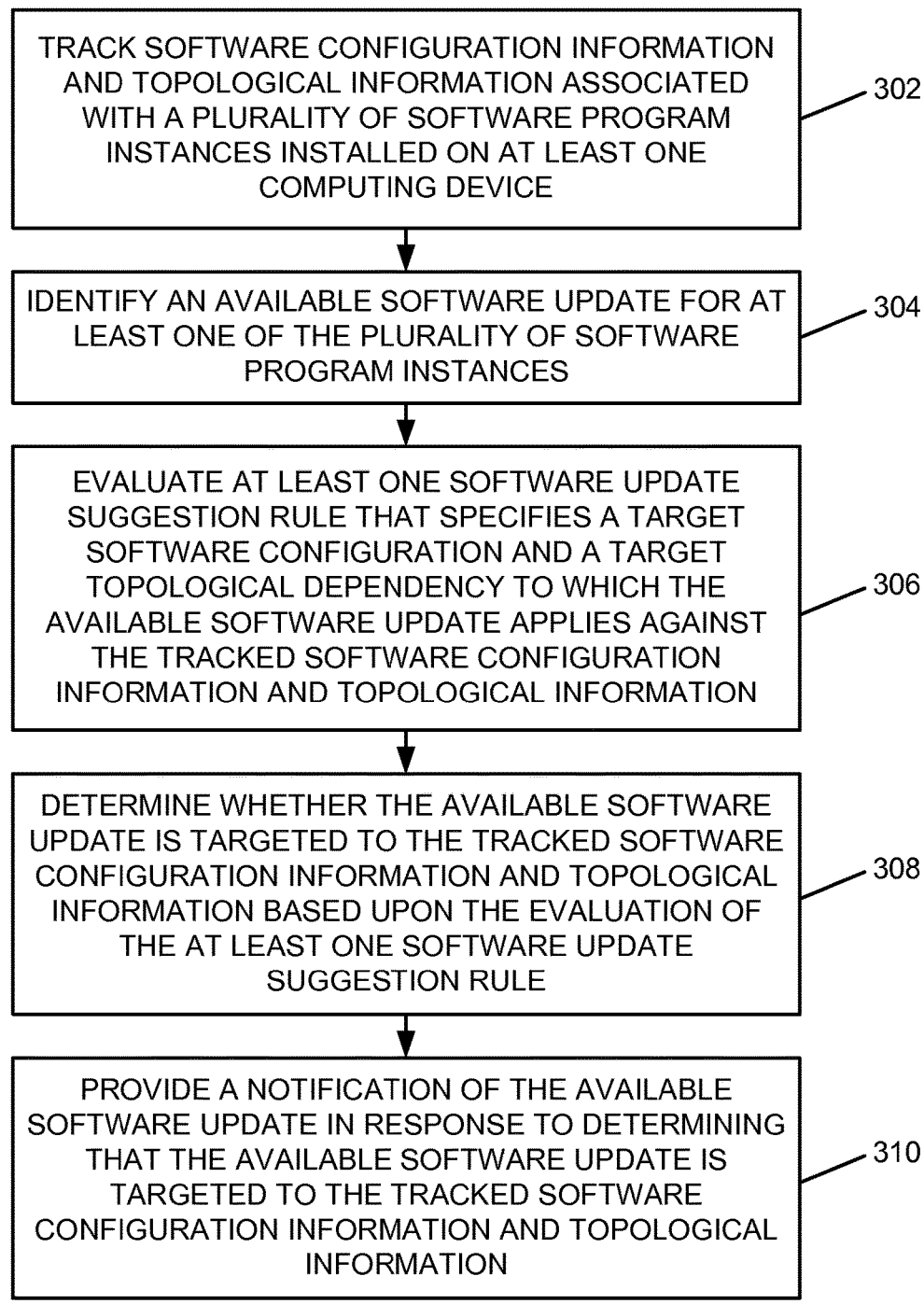
FIG. 3 is a flow chart of an example of an implementation of a process for automated software service notifications based upon software configuration and deployment topology according to an embodiment of the present subject matter.
Figure 4:
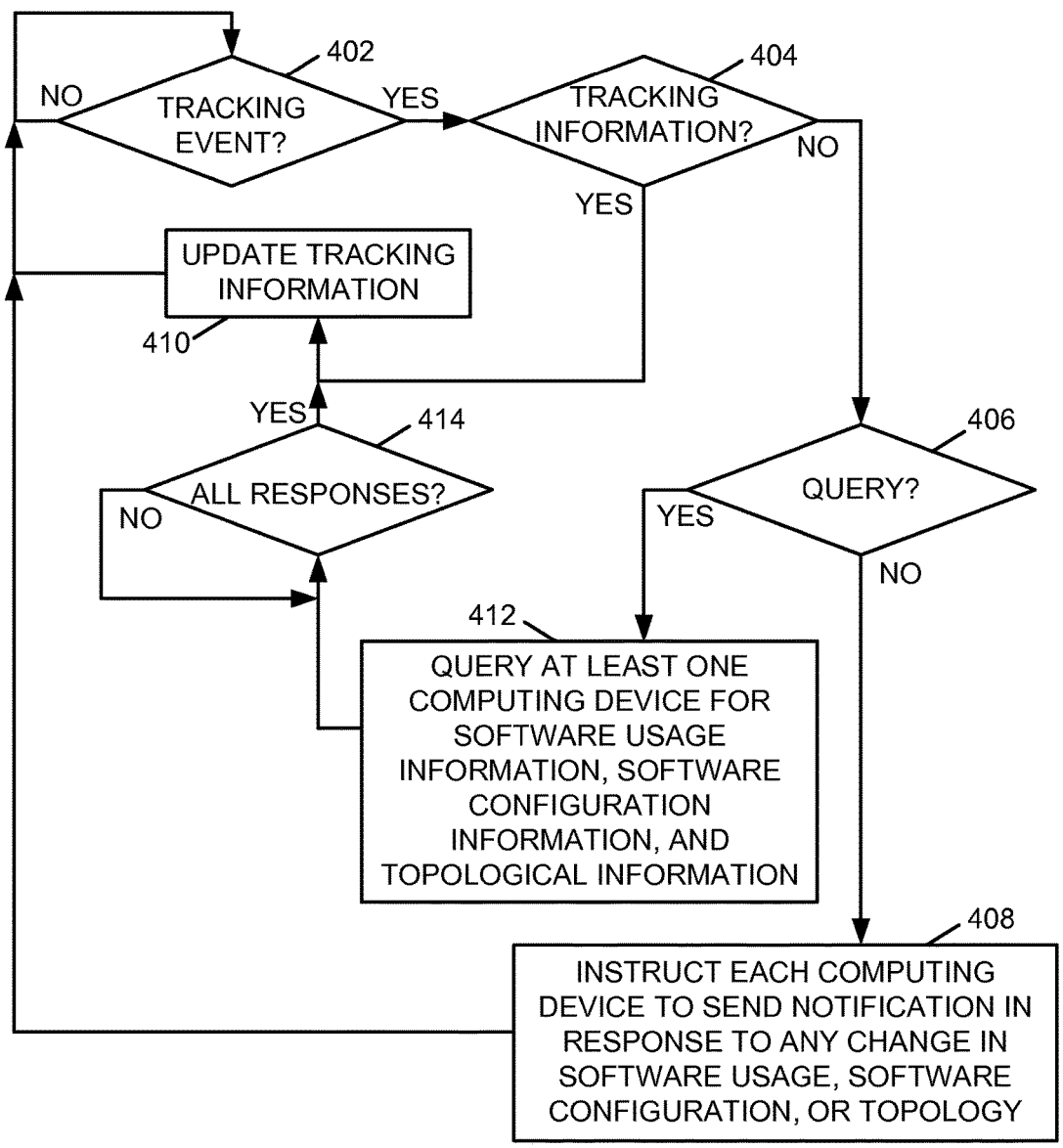
FIG. 4 is a flow chart of an example of an implementation of a process for tracking user software usage information, software configuration information, and topological information for software service notifications based upon software usage, configuration, and deployment topology according to an embodiment of the present subject matter.
Figure 5:
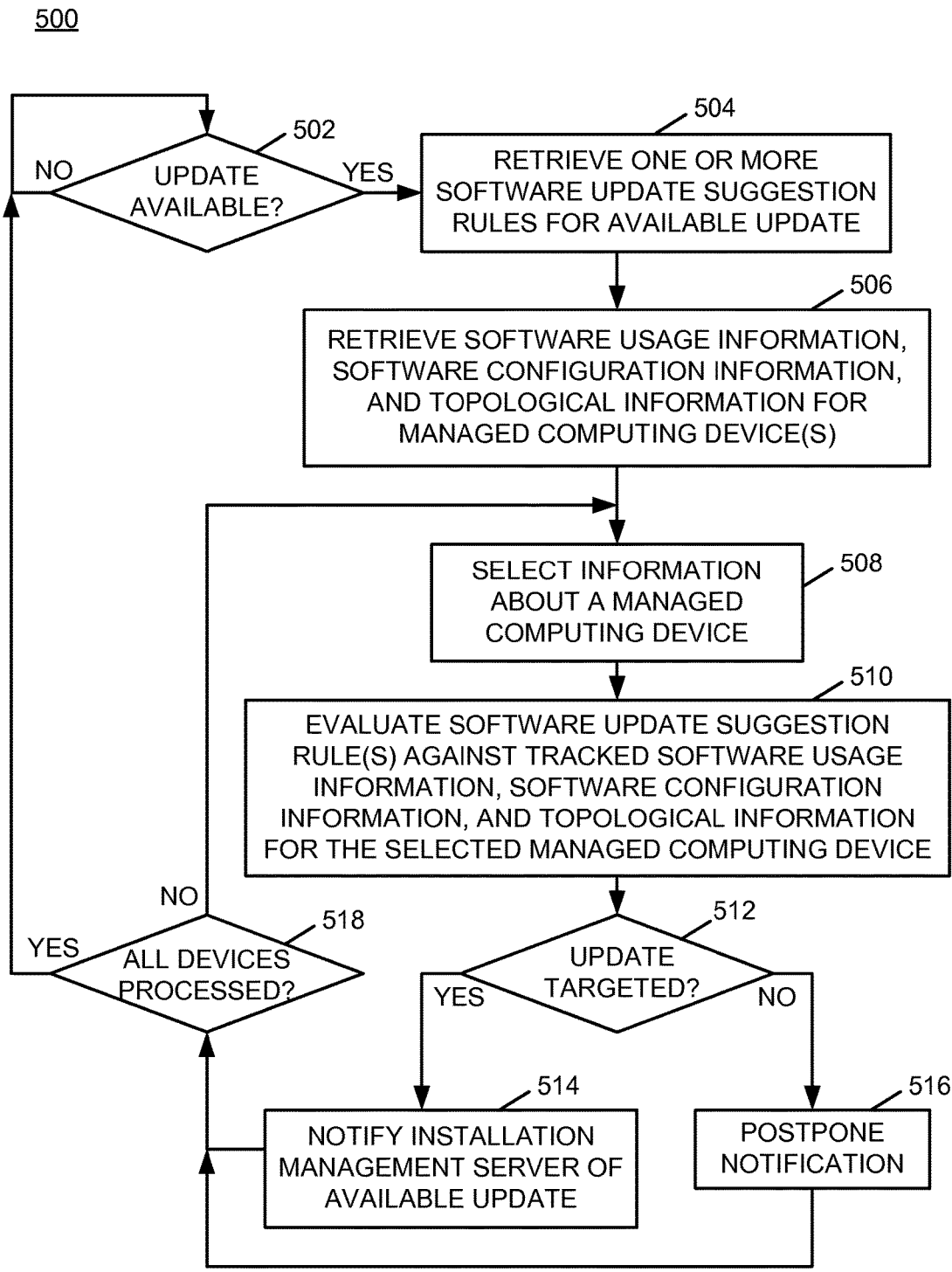
FIG. 5 is a flow chart of an example of an implementation of a process for generating software service notifications based upon tracking of software usage, configuration, and deployment topology of one or more software program instances according to an embodiment of the present subject matter.

FIG. 3 through FIG. 5 below describe example processes that may be executed by devices, such as the core processing module 200, to perform the automated software service notifications based upon software usage, configuration, and deployment topology associated with the present subject matter. Many other variations on the example processes are possible and all are considered within the scope of the present subject matter. The example processes may be performed by modules, such as the update notification processing module 216 and/or executed by the CPU 202, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated software service notifications based upon software configuration and deployment topology. At block 302, the process 300 tracks software configuration information and topological information associated with a plurality of software program instances installed on at least one computing device. At block 304, the process 300 identifies an available software update for at least one of the plurality of software program instances. At block 306, the process 300 evaluates at least one software update suggestion rule that specifies a target software configuration and a target topological dependency to which the available software update applies against the tracked software configuration information and topological information. At block 308, the process 300 determines whether the available software update is targeted to the tracked software configuration information and topological information based upon the evaluation of the at least one software update suggestion rule. At block 310, the process 300 provides a notification of the available software update in response to determining that the available software update is targeted to the tracked software configuration information and topological information.

FIG. 4 is a flow chart of an example of an implementation of a process 400 for tracking user software usage information, software configuration information, and topological information for software service notifications based upon software usage, configuration, and deployment topology. As noted above, the present subject matter may be implemented for tracking software configuration information and topological information for software service notifications based upon software configuration and deployment topology without consideration of user software usage information. The present example illustrates the consideration of user software usage information for efficiency within the present description. At decision point 402, the process 400 makes a determination as to whether a tracking event has been detected. A tracking event may include, for example, expiration of a periodic timer, expiration of an aperiodic timer, a "user action" such as an administrator instructing the installation manager to check for suggested updates/fixes, an initial startup or boot sequence, or notification of a tracking change to one or more of a usage pattern, a configuration, or topology from a managed computing device. Other examples of tracking events are possible and all are considered within the scope of the present subject matter.

In response to determining that a tracking event has been detected at decision point 402, the process 400 makes a determination at decision point 404 as to whether tracking information has been received. It should be noted that managed computing devices may be either queried for software usage, configuration, and topological information, or the managed computing devices may be instructed to send the respective elements of information on a status-change basis. As such, and as described in more detail below, the managed computing devices may be instructed to send the respective information elements in response to a status change, and the received status change information may be recognized and processed in association with decision point 404. Processing for an affirmative determination at decision point 404 will be deferred and described in more detail below.

In response to determining at decision point 404 that tracking information has not been received in association with the current tracking event, the process 400 makes a determination at decision point 406 as to whether the process 400 is currently configured to query the respective managed computing devices for tracking information or whether the process 400 is currently configured to instruct the managed computing devices to send the tracking information. It should be noted that querying the managed computing devices may be performed periodically, aperiodically, or in any other manner appropriate for a given implementation. Further, the managed computing devices may be instructed to send notifications of any status change with respect to software usage information, software configuration information, and topological information periodically, aperiodically, or in any other manner appropriate for a given implementation.

In response to determining at decision point 406 that the process 400 is currently configured to instruct the managed computing devices to send notifications on status change(s) (i.e., not to query the managed computing devices), the process 400 instructs each managed computing device to send user software usage information, software configuration information, and topological information in response to any change in the user software usage information, the software configuration information, and the topological information at block 408. It should be noted that the process 400 may perform the processing to instruct the respective managed computing devices one time or more than once as appropriate for a given implementation. The process 400 returns to decision point 402 to await a new tracking event.

Returning to the description of decision point 404, where the process 400 is configured to instruct managed computing devices to send notifications on status change and has previously instructed the managed computing devices to send notifications, the process 400 may determine at decision point 404 that tracking information has been received from one or more managed computing devices. As such, in response to determining that tracking information has been received from one or more computing devices, the process 400 updates tracking information for the managed computing device(s) from which the change tracking information was received at block 410. The process 400 returns to decision point 402 to await a new tracking event.

Returning to the description of decision point 406, in response to determining that the process 400 is currently configured to query managed computing devices for change tracking information (i.e., not to instruct the managed computing devices to send status-change information), the process 400 queries at least one managed computing device for user software usage information, software configuration information, and topological information related to at least one installed program instance at block 412. As described above, the tracking event may include a periodic or aperiodic time interval. As such, the process 400 may query the respective computing devices in response to expiration of a pre-configured time interval, whether periodic or aperiodic. Further, the process may query all devices at each tracking event or may be configured to process one or a subset of devices at each tracking event. Accordingly, the process 400 may iteratively perform a round robin query operation of managed computing devices or may query all or a subset of managed computing devices in response to a given tracking event.

At decision point 414, the process 400 makes a determination as to whether all responses have been received from the queried computing device(s). For purposes of the present description, it is assumed that inter-event timing for tracking events is configured such that all computing devices that are queried have time to and will respond within the appropriate interval or period between each tracking event. As described above, appropriate error handling may be implemented as appropriate for any given implementation or additional processing may be added to the process 400 to manage situations where devices do not respond within a reasonable time period. In response to determining that all responses for all queried devices have been received, the process 400 updates any changes identified within the returned responses at block 410 and returns to decision point 402 and iterates as described above.

As such, the process 400 responds to a variety of change tracking events and may instruct managed computing devices to send updates on status-change events for any tracked information, or the process 400 may query managed computing devices as appropriate for a given implementation. Tracked information is updated in response to any changes.

The processing as described below in association with FIG. 5 may be utilized in conjunction with the tracked information, as described in more detail below, to provide notifications of available updates that are relevant to the particular usage and installation for the respective managed computing devices.

FIG. 5 is a flow chart of an example of an implementation of a process 500 for generating software service notifications based upon tracking of software usage, configuration, and deployment topology of one or more software program instances. As noted above, the present subject matter may be implemented for generating software service notifications based upon tracking of configuration and deployment topology of one or more software program instances without consideration of software usage. The present example illustrates the consideration of software usage for efficiency within the present description. At decision point 502, the process 500 makes a determination as to whether a software update for any installed program instance associated with any computing device managed by the process 500 is available. As described above, a determination as to whether an update is available may be made by comparing information recorded by an installation management server, such as the installation management server 110, and metadata about software service and updates available at a software update server, such as the software update server 112.

In response to determining at decision point 502 that a software update is available for at least one installed program instance, the process 500 retrieves one or more software update suggestion rules for the available update at block 504. The software update suggestion rule(s) may be retrieved, for example, from the update/service repository 114 or may be provided by the software update server 112, or may be retrieved otherwise as appropriate for a given implementation. It should be noted that there may be many rules or a single rule for a particular service update as appropriate for a given implementation.

At block 506, the process 500 retrieves software usage information, software configuration information, and software topological information for computing devices managed by the device that is executing the process 500 (again, this may be the current device that is executing the process 500 for a stand-alone implementation). At block 508, the process 500 selects information about a managed computing device, where more than one computing device is managed, from the retrieved information. At block 510, the process 500 evaluates the retrieved software update suggestion rule(s) against the retrieved tracked software usage information, software configuration information, and topological information for the selected managed computing device.

As described above, the software update suggestion rule may specify a target usage pattern, a target software configuration, and/or a target topological dependency to which the available software update applies. As such, evaluation of the software update suggestion rule may include comparing the target usage pattern against the tracked user software usage information of the selected managed computing device. Evaluation of the software update suggestion rule may further include comparing the target software configuration with the tracked software configuration information of the selected managed computing device. Evaluation of the software update suggestion rule may further include comparing the target topological dependency with the tracked topological information for each program instance installed on the selected managed computing device.

At decision point 512, the process 500 makes a determination as to whether the available software update is targeted to the selected managed computing device. Determining whether the update is targeted to the selected managed computing device includes determining whether the target usage patterns matches the tracked user software usage information, whether the target software configuration matches the tracked software configuration information, and/or whether the target topological dependency matches the tracked topological information, as appropriate for a given implementation.

In response to determining that the available software update is targeted to the selected managed computing device at decision point 512, the process 500 notifies the installation management server 110 of the available software update at block 514. In response to determining at decision point 512 that the available software update is not targeted to the selected managed computing device, the process 500 postpones notification of the available software update at block 516.

In response to either notifying the selected managed computing device of the available software update at block 514, or postponing notification of the available software update at block 516, the process 500 makes a determination at decision point 518 as to whether all managed computing devices have been processed. In response to determining that all managed computing devices have not been processed, the process 500 returns to block 508 to select another managed computing device and iterates as described above. In response to determining that all managed computing devices have been processed, the process 500 returns to decision point 502 to await a new software update event. It should be noted that the respective computing devices that are managed by the process 500 may independently retrieve and install software updates for which the respective managed computing devices have been notified. Alternatively, the process 500 may be modified to retrieve the actual software update and forward the software update to the respective managed computing devices without departure from the scope of the present subject matter.

As such, the process 500 determines whether software updates are available for program instances installed on one or more managed computing devices. The process 500 retrieves a software update suggestion rule and evaluates that rule against tracked software usage information, software configuration information, and topological information for managed computing devices. The process 500 iteratively evaluates the retrieved software update suggestion rule for each managed computing device that executes the program instance for which the available software update has been identified, and selectively notifies computing devices of available software updates where the available update is relevant/targeted to the tracked software usage information, software configuration information, and topological information. The process 500 further postpones notifications of available software updates where the available update is determined not to be relevant/targeted to software usage patterns, software configurations, and software topologies associated with managed computing devices. As such, the process 500 improves software update notifications by providing notifications to installation management servers and/or computing devices for which the respective software updates are relevant, and omitting notifications to computing devices where the respective software updates are not relevant.

As described above in association with FIG. 1 through FIG. 5, the example systems and processes provide software service notifications based upon software usage, configuration, and deployment topology. Many other variations and additional activities associated with software service notifications based upon software usage, configuration, and deployment topology are possible and all are considered within the scope of the present subject matter.

Those skilled in the art will recognize, upon consideration of the above teachings, that certain of the above examples are based upon use of a programmed processor, such as the CPU 202. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as JAVA®, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method implemented with a processor having stored thereon executable instructions effecting functionality of an install manager module, where the instructions when executed by the processor, cause functionality of the install manager module to be carried out, comprising executing by an install manager module:

receiving a software interoperation configuration data set including information indicative of a software configuration of installation-specific processing actions performed by a target computer system as part of interoperation among a set of interoperating computer systems;

receiving a deployment topology data set including information indicative of an established inter-operational deployment topology that specifies a set of different installation-specific processing responsibilities and processing dependencies configured between the target computer system and at least one other computer system of the set of interoperating computer systems;

determining, by machine logic of the install manager module, a first fix relevancy recommendation including information indicative of relevancy of program-specific aspects of a first prospective fix with respect to the target computer system, with the determination being based, at least in part, upon programmed evaluation of: (i) improvement of the installation-specific processing actions performed by the target computer system as specified within the software interoperation configuration data set, and (ii) improvement of the set of different installation-specific processing responsibilities and processing dependencies specified within the deployment topology data set; and outputting the first fix relevancy recommendation as an electronic software service notification to at least the target computer system responsive to a high determined relevancy of the first prospective fix, where computing technology is improved by reducing system downtime associated with installation and system re-testing of the set of interoperating computer systems by deferring output of the first fix relevancy recommendation responsive to a low determined relevancy of the first prospective fix.

2. The method of claim 1, where the established inter-operational deployment topology includes information indicative of:

interconnectivity between the target computer system and other programs and/or devices of the set of interoperating computer systems;

different configured processing responsibilities of the target computer system relative to the other programs and/or devices of the set of interoperating computer systems between which responsibility differences are configured;

inter-product processing dependencies of the target computer system on the other programs and/or devices of the set of interoperating computer systems; and interactions configured to be performed by the target computer system with the other programs and/or devices of the set of interoperating computer systems.

3. The method of claim 1, where the software configuration further includes information indicative of:

installation options of one or more software programs of the target computer system used to configure the target computer system for the interoperation among the set of interoperating computer systems;

different purposes for individual computer systems in the set of interoperating computer systems of which the target computer system is a part;

configurable options that define one or more behaviors of one or more programs installed with the target computer system;

how the target computer system is configured to work with one or more other program and/or device installation options of other computer systems of the set of interoperating computer systems;

how a particular program instance is configured for the target computer system to interoperate within the set of interoperating computer systems; and user configuration options.

4. The method of claim 1, where interoperations of the set of interoperating computer systems are improved by recommending the first prospective fix responsive to the high determined relevancy.

5. The method of claim 1, where the install manager module manages installation of the first prospective fix on the target computer system in further response to the high determined relevancy.

6. A system comprising:

an output device; and a processor programmed to execute an install manager module to:

receive a software interoperation configuration data set including information indicative of a software configuration of installation-specific processing actions performed by a target computer system as part of interoperation among a set of interoperating computer systems;

receive a deployment topology data set including information indicative of an established inter-operational deployment topology that specifies a set of different installation-specific processing responsibilities and processing dependencies configured between the target computer system and at least one other computer system of the set of interoperating computer systems;

determine, by machine logic of the install manager module, a first fix relevancy recommendation including information indicative of relevancy of program-specific aspects of a first prospective fix with respect to the target computer system, with the determination being based, at least in part, upon programmed evaluation of: (i) improvement of the installation-specific processing actions performed by the target computer system as specified within the software interoperation configuration data set, and (ii) improvement of the set of different installation-specific processing responsibilities and processing dependencies specified within the deployment topology data set; and output, via the output device, the first fix relevancy recommendation as an electronic software service notification to at least the target computer system responsive to a high determined relevancy of the first prospective fix, where computing technology is improved by reducing system downtime associated with installation and system re-testing of the set of interoperating computer systems by deferring output of the first fix relevancy recommendation responsive to a low determined relevancy of the first prospective fix.

7. The system of claim 6, where the established interoperational deployment topology includes information indicative of:

interconnectivity between the target computer system and other programs and/or devices of the set of interoperating computer systems;

different configured processing responsibilities of the target computer system relative to the other programs and/or devices of the set of interoperating computer systems between which responsibility differences are configured;

inter-product processing dependencies of the target computer system on the other programs and/or devices of the set of interoperating computer systems; and interactions configured to be performed by the target computer system with the other programs and/or devices of the set of interoperating computer systems.

8. The system of claim 6, where the software configuration further includes information indicative of:

installation options of one or more software programs of the target computer system used to configure the target computer system for the interoperation among the set of interoperating computer systems;

different purposes for individual computer systems in the set of interoperating computer systems of which the target computer system is a part;

configurable options that define one or more behaviors of one or more programs installed with the target computer system;

how the target computer system is configured to work with one or more other program and/or device installation options of other computer systems of the set of interoperating computer systems;

how a particular program instance is configured for the target computer system to interoperate within the set of interoperating computer systems; and user configuration options.

9. The system of claim 6, where interoperations of the set of interoperating computer systems are improved by recommending the first prospective fix responsive to the high determined relevancy.

10. The system of claim 6, where the install manager module manages installation of the first prospective fix on the target computer system in further response to the high determined relevancy.

11. A computer program product comprising a computer readable storage medium including computer readable program code, where the computer readable program code when executed on a computer causes the computer execute an install manager module to:

receive a software interoperation configuration data set including information indicative of a software configuration of installation-specific processing actions performed by a target computer system as part of interoperation among a set of interoperating computer systems;

receive a deployment topology data set including information indicative of an established inter-operational deployment topology that specifies a set of different installation-specific processing responsibilities and processing dependencies configured between the target computer system and at least one other computer system of the set of interoperating computer systems;

determine, by machine logic of the install manager module, a first fix relevancy recommendation including information indicative of relevancy of program-specific aspects of a first prospective fix with respect to the target computer system, with the determination being based, at least in part, upon programmed evaluation of:
(i) improvement of the installation-specific processing actions performed by the target computer system as specified within the software interoperation configuration data set, and (ii) improvement of the set of different installation-specific processing responsibilities and processing dependencies specified within the deployment topology data set; and output the first fix relevancy recommendation as an electronic software service notification to at least the target computer system responsive to a high determined relevancy of the first prospective fix, where computing technology is improved by reducing system downtime associated with installation and system re-testing of the set of interoperating computer systems by deferring output of the first fix relevancy recommendation responsive to a low determined relevancy of the first prospective fix.

12. The computer program product of claim 11, where the established inter-operational deployment topology includes information indicative of:
interconnectivity between the target computer system and other programs and/or devices of the set of interoperating computer systems;
different configured processing responsibilities of the target computer system relative to the other programs and/or devices of the set of interoperating computer systems between which responsibility differences are configured;
inter-product processing dependencies of the target computer system on the other programs and/or devices of the set of interoperating computer systems; and
interactions configured to be performed by the target computer system with the other programs and/or devices of the set of interoperating computer systems.

13. The computer program product of claim 11, where the software configuration further includes information indicative of:
installation options of one or more software programs of the target computer system used to configure the target computer system for the interoperation among the set of interoperating computer systems;
different purposes for individual computer systems in the set of interoperating computer systems of which the target computer system is a part;
configurable options that define one or more behaviors of one or more programs installed with the target computer system;
how the target computer system is configured to work with one or more other program and/or device installation options of other computer systems of the set of interoperating computer systems;
how a particular program instance is configured for the target computer system to interoperate within the set of interoperating computer systems; and
user configuration options.

14. The computer program product of claim 11, where interoperations of the set of interoperating computer systems are improved by recommending the first prospective fix responsive to the high determined relevancy.

15. The computer program product of claim 11, where the install manager module manages installation of the first prospective fix on the target computer system in further response to the high determined relevancy.

* * * * *